United States Patent [19]

Williams

[11] Patent Number: 4,460,153

[45] Date of Patent: Jul. 17, 1984

[54] LEVER OPERATOR FOR A VALVE CONTROL AND ACTUATING MECHANISM

[75] Inventor: Kenneth R. Williams, Huntington Beach, Calif.

[73] Assignee: Aerojet-General Corporation, La Jolla, Calif.

[21] Appl. No.: 329,647

[22] Filed: Dec. 11, 1981

[51] Int. Cl.³ ............... F16K 35/02; F16K 31/52
[52] U.S. Cl. ...................................... 251/99; 74/54; 74/471 XY; 70/176; 70/180; 251/104; 251/215; 251/229; 251/251; 137/385
[58] Field of Search .............. 70/176, 177, 180, 193, 70/194, 196, 205, 206, 212; 74/54, 471 XY, 567, 570; 137/383, 385; 251/56, 215, 229, 251, 101, 103, 104, 105, 107, 309, 95, 99

[56] References Cited

U.S. PATENT DOCUMENTS

| | | | |
|---|---|---|---|
| 1,758,727 | 5/1930 | Wildin | 251/104 |
| 2,553,349 | 5/1951 | Annicq | 251/107 |
| 3,228,415 | 1/1966 | Geiss | 251/101 |
| 3,329,394 | 7/1967 | Overbaugh | 251/99 |
| 3,492,880 | 2/1970 | Pearson | 251/58 |
| 3,793,893 | 2/1974 | Heinen | 251/229 |
| 3,865,130 | 2/1975 | Mullis | 137/385 |
| 4,126,294 | 11/1978 | DeFrees | 251/99 |
| 4,130,129 | 12/1978 | Pollock | 137/385 |
| 4,234,157 | 11/1980 | Hodgeman et al. | 251/56 |
| 4,293,117 | 10/1981 | Mueller | 251/229 |
| 4,350,322 | 9/1982 | Mueller | 251/229 |

*Primary Examiner*—George L. Walton
*Attorney, Agent, or Firm*—Leonard Tachner

[57] ABSTRACT

A lever operator for use primarily with valves of the plug type in which a tapered plug is raised to unseat associated slips and then rotated to a valve open position during opening of the valve and is rotated to a valve close position and lowered to seat the associated slips for closing the valve. The lever operator comprises an elongated lever arm having an eccentric cam at one end thereof connected to the trunnion of the valve to which the invention is assembled and also comprises a unique dual slot gate mechanism which houses the lever arm and restricts the motion of the arm to the requisite vertical and rotational movement which must be carried out in the appropriate sequence to properly operate the tapered plug mechanism of the valve.

15 Claims, 7 Drawing Figures

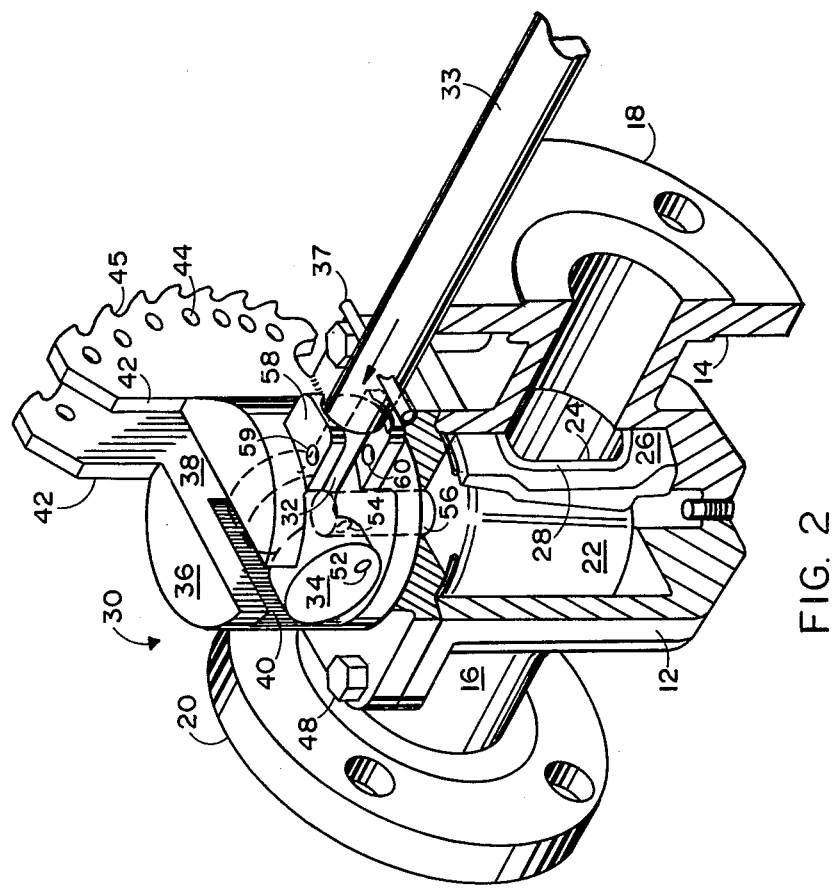
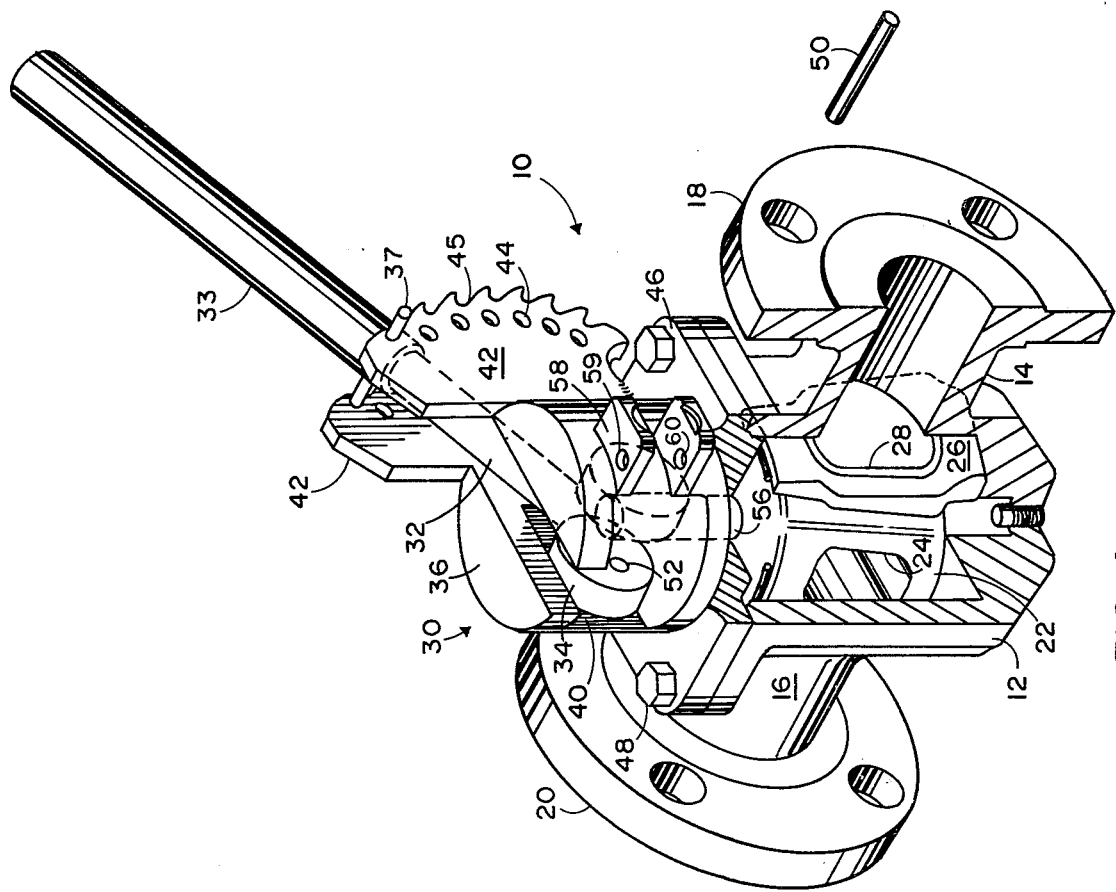
FIG. 2
FIG. 1

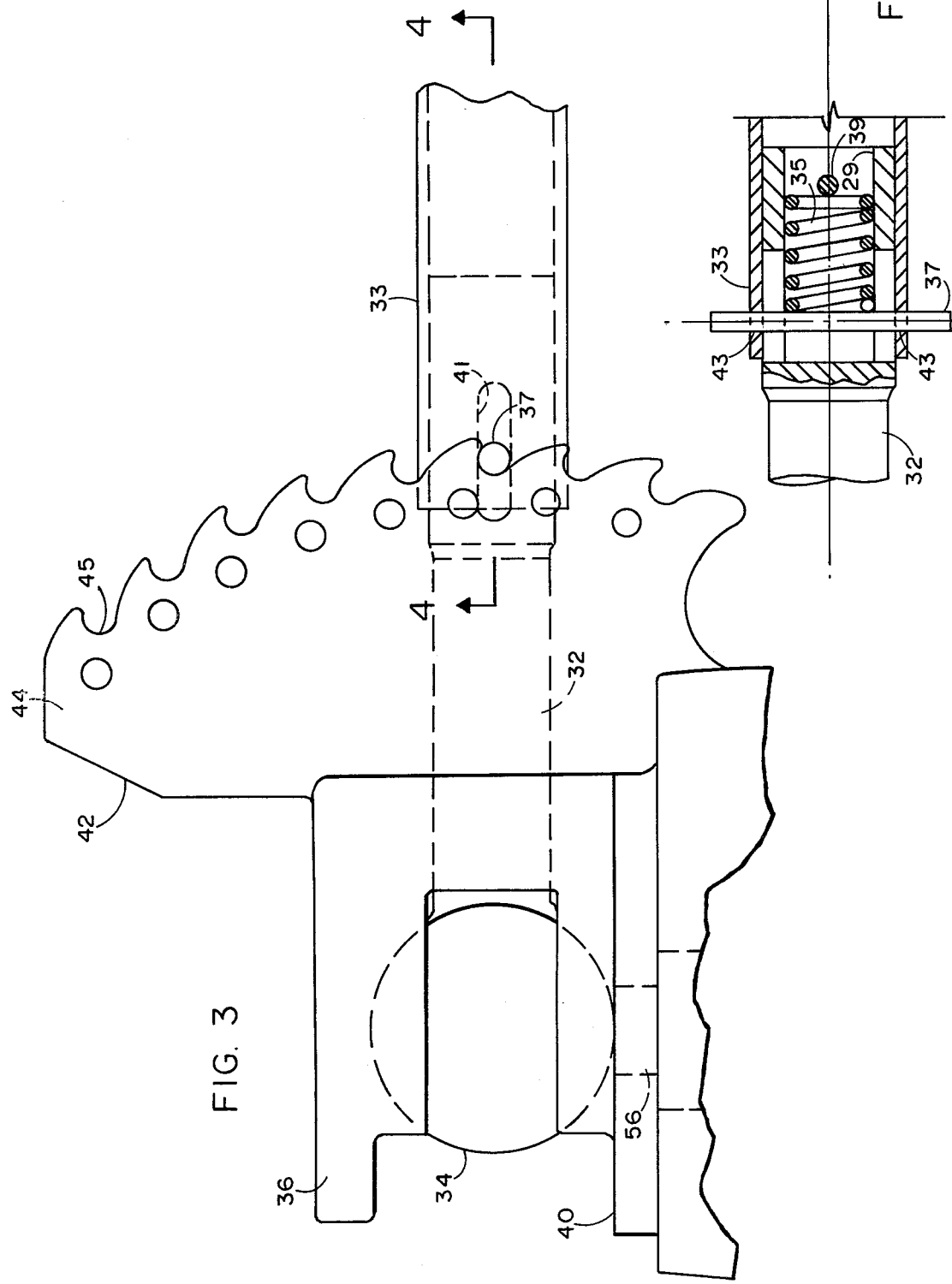

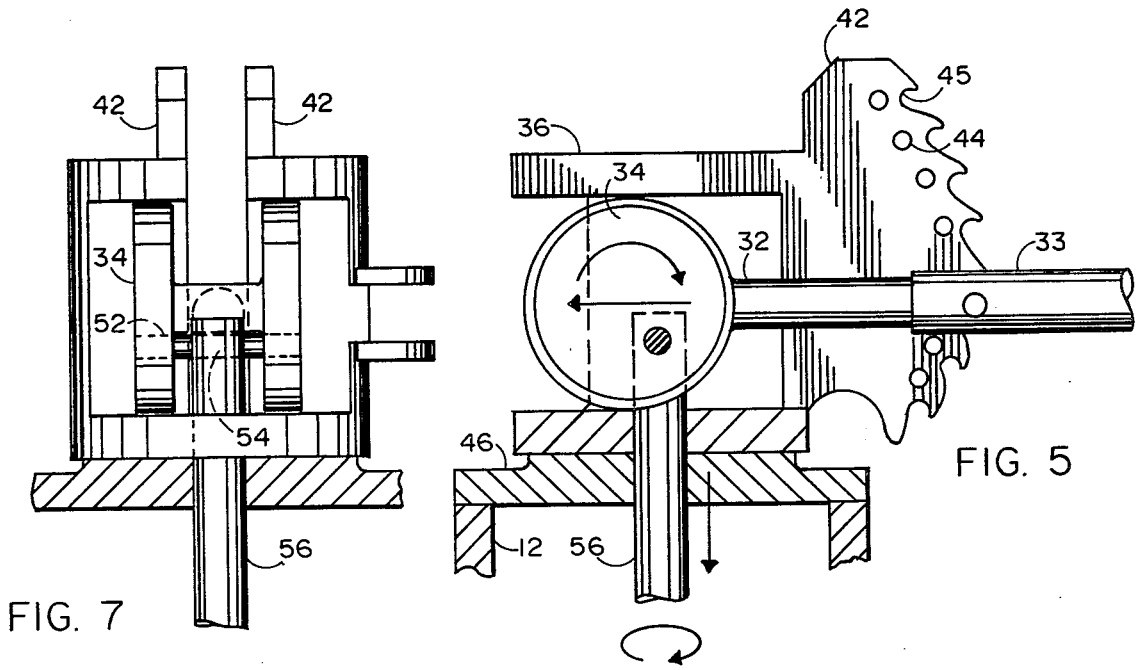
FIG. 5
FIG. 7
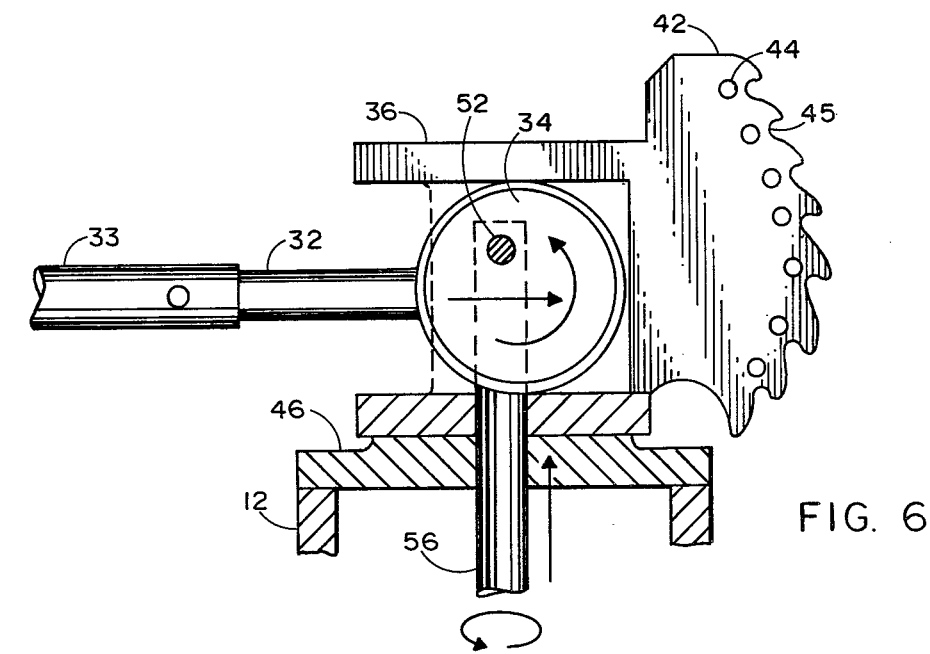
FIG. 6

LEVER OPERATOR FOR A VALVE CONTROL AND ACTUATING MECHANISM

TECHNICAL FIELD

This invention relates generally to fluid control valves and more specifically to a lever arm operator for valves of the plug type in which a tapered plug is raised to unseat associated slips and then rotated to a valve open position for opening the valve and in which the opposite actions are carried out to close the valve. The lever arm operator of the present invention is designed to facilitate the aforementioned vertical and rotational movements in the proper sequence while substantially simplifying the mechanical operator assembly thereby substantially reducing the overall maintenance and cost of such valves.

BACKGROUND ART

Plug type valves are well known in the prior art, particularly in the oil and gas industries where their positive sealing and superior flow characteristics are highly advantageous for controlling the flow of such fluids. Plug type valves are generally the type in which a valve body is provided with a pair of coaxial ports which are connected to incoming and outgoing fluid lines for the movement of fluid under pressure therethrough. Typically, a plug is adapted to selectively rotate within the main chamber of the valve to either provide a continuous channel between the incoming and outgoing coaxial ports when the valve is in the open position or to provide a fluid tight seal in one or both of the coaxial interconnecting ports when the valve is in the close position.

A particularly advantageous plug type valve operating mechanism is disclosed in U.S. Pat. No. 3,492,880 to Pearson which is assigned to the assignee of the present invention. That patent discloses the use of a valve control and actuating mechanism that permits rotation and axial linear motion of the valve plug in separate discrete movements in order to effect inward and outward movement of the sealing mechanism to assure a good seal in a closed valve and to further assure withdrawal of the seal from the valve ports without substantially reducing the life of the seals by permitting them to forcefully rub along the inside surface of the valve body.

One drawback of the otherwise advantageous valve control and actuating mechanism disclosed in the aforementioned U.S. Pat. No. 3,492,880 is the relative complexity of the operator mechanism disclosed for providing the requisite sequential vertical and rotatable motion of the plug. Such complexity renders the operating mechanism, as well as the entire valve, expensive to produce and to purchase and also more difficult and costly to maintain over its operating life. The present invention provides the aforementioned vertical and rotational motion of the plug portion of the valve in a far simpler and thus highly advantageous lever configuration that permits achievement of all the aforementioned advantageous functional operating characteristics of the previously disclosed plug valve control and actuating mechanism while significantly reducing the overall complexity of the valve and by also reducing the costs of manufacture and maintenance thereof.

SUMMARY OF THE INVENTION

The present invention comprises an elongated lever arm having an eccentric cam at one end that is attached to the valve plug trunnion and further comprises a gated lever arm housing including gates or slots in which the lever arm rides and which restrict the direction and sequence of motion of the lever arm to provide the requisite control of valve plug motion for opening and closing the valve.

It is therefore an object of the present invention to provide a simplified operating mechanism for a plug type valve that will effectively rotate the valve plug and move it axially in separate discrete movements in order to effect inward and outward movements of the sealing elements of the valve.

It is an additional object of the present invention to provide a valve operator mechanism primarily for use with a plug type valve in which the operative element is a simple cam/lever configuration in which the lever is constrained for sequential motion in the vertical and rotational directions to effectuate opening and closing of the valve.

It is still an additional object of the present invention to provide a valve operator mechanism for a plug type valve in which the mechanism comprises an integral cam/lever assembly including a lever arm that is guided by slots in the operator housing to provide distinct sequential vertical and rotational motion to effectuate opening and closing of the valve.

It is still an additional object of the present invention to provide a valve of the type disclosed in U.S. Pat. No. 3,492,880 but with a substantial simplification of the valve operator mechanism to effect a reduction in manufacturing cost and maintenance cost.

BRIEF DESCRIPTION OF THE DRAWINGS

These and other objects and advantages of the invention will be readily apparent from the consideration of the following detailed description of a preferred embodiment taken in conjunction with the accompanying drawings in which:

FIG. 1 is a three-dimensional cut-away view of a plug valve illustrating the position of the lever operator of the present invention in the closed valve position;

FIG. 2 is a three-dimensional cut-away view of the same valve with the lever operator of the present invention shown in the opened valve position;

FIG. 3 is a side exterior view of the present invention;

FIG. 4 is a partially cut away view of a portion of the present invention taken along lines 3—3 of FIG. 3; and FIGS. 5-7 provide three different views of the cammed lever arm portion of the present invention.

DETAILED DESCRIPTION OF THE PREFERRED EMBODIMENT

Referring now to FIG. 1, there is shown a plug valve 10 of the type having a hollow valve body 12, and inlet and outlet channels 14 and 16, respectively. Channels 14 and 16 terminate in a pair of flanges 18 and 20, respectively, for securing the valve to upstream and downstream interconnecting pipes, respectively. Plug valve 10 operates to selectively open and close the fluid path between inlet and outlet channels 14 and 16 by means of rotatable plug 22 which includes a passageway 24. On each side of plug 22 adjacent the inlet and outlet channels 14 and 16 respectively, is a wedge-shaped slip 26 with a flat inner surface adapted to engage a corresponding flat surface on plug 22. Slip 26 also comprises a generally arcuate outer surface upon which is attached a substantially rectangular flexible seal 28 which is adapted to firmly engage the inside surface of valve body 12 along the perimeter of the inlet and outlet channels 14 and 16 when the valve is in the closed position.

It will be understood by those having skill in the relevant art, that the plug type valve of the general construction illustrated in FIG. 1, may be successfully utilized with slips and seals on both sides of the plug for sealing both upstream and downstream channels relative to the valve plug, or may alternatively be utilized with only a single such slip and seal arrangement, preferably on the upstream side of the valve. In either case, it will be observed that the valve is shown in the closed position in FIG. 1 wherein the passageway 24 has been rotated until its axis is substantially perpendicular to the inlet and outlet channels 14 and 16. In addition, plug 22 has been forced vertically into its lowermost position in valve body 12 thereby applying laterally outward directed pressure against the flat wedged surface of slip 26 to forcefully engage seal 28 with the perimeter of channel 16 along the inside surface of valve body 12. It will be further observed that in order to effect opening of the valve without forcefully rubbing or scraping seal 28 against the valve body surface, two sequential and independent forms of motion are needed. These two motions comprise a vertical motion of plug 22 sufficient to reduce the pressure of the seals against the valve body surface to avoid the aforementioned scraping, and a subsequent rotation of plug 22 to effect alignment of passageway 24 with input and output channels 14 and 16 respectively, thereby enabling unobstructed fluid flow through valve 10. It will further be observed that closing of the valve is achieved by carrying out the aforementioned sequential motions in the opposite order. Thus, to place valve 10 in the closed position, plug 22 is rotated until passageway 24 is again perpendicular to the inlet and outlet channels and then vertical downward motion of plug 22 is applied to achieve requisite sealing pressure to the slips 26 and seals 28 respectively, thereby enabling blockage of the fluid flow through valve 10 and also assuring a good seal to prevent inadvertant leakage.

FIG. 1 also illustrates the simple but unique and effective lever operator apparatus of the present invention that is connected to valve 10 in order to effectuate the aforementioned distinct sequential motions of plug 22 for opening and closing the valve as previously described. More specifically, it is seen in FIG. 1 that the operator apparatus 30 of the present invention comprises an elongated lever arm 32 which terminates at the valve end in a pair of circular cams 34 and which terminates at the other end in concentric engagement with an outer tubular handle 33. Arm 32 and handle 33 are interconnected in tensioned engagement as will be hereinafter more fully disclosed in conjunction with FIG. 3. Operator apparatus 30 of the present invention also comprises an operator housing 36 which is of a generally hollow cylindrical configuration and which comprises a vertical motion gate 38, a horizontal motion gate 40, a pair of ears 42, and a housing base 46.

As seen best in FIGS. 5 and 6, cams 34 each provides an eccentrically located pinhole 52 aligned with a corresponding pinhole 54 in the valve plug trunnion 56. A pin 50 is adapted to extend through both cams 34 and through trunnion 56 by means of the aforementioned aligned holes to provide the requisite attachment of lever arm 32 to plug 22. When the plug valve 10 is in the closed position as represented by FIG. 1, lever arm 32 is positioned substantially horizontally between ears 42 with outer handle 33 and a pin 37 to be described hereinafter, compressively engaging a selected number of notches 45 provided along the outer edge of ears 42. The compressive engagement of outer handle 33 with notches 45 provides a secure closed position of valve 10.

However, lever arm 32 may be positively locked in this position by the insertion of a padlock or other similar locking mechanism through selected locking holes 44 of ears 42 to prevent any substantial motion of lever arm 32 in the closed valve position.

When it is desired to open the plug valve 10 to enable fluid to flow therethrough, the locking apparatus is removed and outer handle 33 is pulled away from the cam end of the lever arm coaxially with the arm until handle 33, including pin 37, is disengaged from notches 45 thereby freeing the arm 32 for motion within housing 36. At this point lever arm 32 may be moved in only one direction namely along an arc having a center point coincident with the axes of pin 50 and eccentrically located cam holes 52. This motion is restricted by a vertical motion gate 38 forming part of housing 36. It will be understood that this arcuate motion of lever arm 32 produces upward vertical motion of trunnion 56 and plug 22 as a result of the eccentric location of cam holes 52. The lever arm 32 is swung through an arc of about 180 degrees until it is again substantially horizontal on the opposite side of housing 36. At this point, trunnion 56 and therefore plug 22, will be at their maximum upper vertical positions with respect to the valve body 12. As a result, plug 22 will be substantially higher within valve body 12. Relative slippage of the wedged shaped surfaces between plug 22 and slips 26 permits inward radial movement of the slips, thereby substantially reducing the pressure of seals 28 against the inside surface of valve body 12 along the perimeter of inlet and outlet channels 16.

Plug assembly 22, including slips 26, is then in a condition for rotational motion through of an arc of approximately 90 degrees to place passageway 24 in substantial alignment with input and outlet channels 14 and 16, but without scraping seals 28 against the inside surface of valve body 12. This rotational motion is effected by again swinging lever arm 32 through an arc, but in this case through an arc in a horizontal plane within horizontal motion gate 40 of operator housing 36. It will be observed that at the termination of this horizontal 90 degree arc, lever arm 32 is substantially aligned with outlet channel 14 of valve 10 and passageway 24 is in substantial alignment with channels 14 and 16 thus placing valve 10 in the fully opened configuration as represented by FIG. 2. It will be observed in FIG. 2 that in order to place lever arm 32 in the fully opened position, as shown therein, it is necessary to clear the outermost surface of a pair of flats 58. This is accomplished by again pulling outer handle 33 in a direction opposite cams 34 and a sufficient distance to clear the surface of flats 58 and allowing handle 33 to rest against the outside surfaces thereof. It will also be observed in FIG. 2, that in this position means are provided to again lock the lever arm, namely, by placing a suitable locking device such as a padlock through suitably located holes 59 and 60 in flats 58 thereby securely locking plug valve 10 in an open position.

It will be understood that the aforementioned sequential arcuate movements of lever arm 32 may be carried out in reverse order thereby again positioning lever arm 32 as illustrated in FIG. 1 and placing valve 10 in the closed configuration. It will also be observed that housing 36 may be secured to valve body 12 by means of bolts 48 through a plurality of holes in base 46 aligned with suitably matched threaded holes in the upper surface of valve body 12. Such means for interconnecting the operator housing of the present invention and valve body 12, permits easy installation of the present invention into existing plug type valves. However, it should be noted that such means for interconnection are provided by way of illustration only and that it would be well within the art of valve manufacture to provide the operator apparatus of the present invention, including the housing thereof, as an integral portion of the entire valve body.

Reference shall now be made to FIGS. 3 and 4 for further description of the operator housing 36, lever arm 32, and the interconnection of the arm and outer handle 33. More specifically, as shown in FIG. 3 outer handle 33 is configured in overlapping concentric engagement with the uncammed end of lever arm 32. A spring 35 resides in a cylindrical chamber 29 in lever arm 32. This spring is coaxial with both the lever arm and the outer handle. Spring 35 is contained within chamber 29 in a partially compressed condition by means of roll pins 37 and 39. Roll pin 37 passes entirely through lever arm 32 through elongated slots therein and then through circular holes 43 in outer handle 33. Roll pin 39, however, which is oriented perpendicular to roll pin 37, passes into holes in only lever arm 32. The relative positions of roll pin 37 and 39 with respect to spring 35 within chamber 29, are best seen in FIG. 4. A slot 41, along which roll pin 37 is adapted to travel with the relative motion of outer handle 33 with respect to lever arm 32, is shown best in FIG. 3.

It will be understood that because of the partially compressed state of spring 35, as seen in FIGS. 3 and 4, roll pin 43 and thus outer handle 33 exert a selected compressive force against the outer edge of ears 42 with roll pin 37 particularly adapted to fit snugly within notch 45. Furthermore, it will be now understood that when it is desired to move lever arm 32 relative to ears 42 in order to effect opening of valve 10 as previously disclosed in conjunction with FIGS. 1 and 2, this is accomplished by pulling outer handle 33 toward the uncammed end of arm 32 as seen in FIG. 3 thereby further compressing spring 35, while roll pin 37 travels within elongated notch 41 thereby disengaging from a corresponding notch 45 along the outer edge of ears 42.

Reference will now be made to FIGS. 5-7 for more detailed description of the cammed portion of lever arm 32 and the interface thereof with trunnion 56 of plug 22. More specifically, as seen in the aforementioned figures, the cammed end of lever arm 32 comprises a pair of circular shaped cams 34 having respective, axially aligned, eccentrically located apertures 52 which are adapted for alignment with hole 54 of trunnion 56 and which receive pin 50 for securing the lever arm to the trunnion. As further shown, particularly in FIGS. 5 and 6, the position of axially aligned holes 52 in cams 34 relative to trunnion 56, provides the requisite amount of vertical travel when lever arm 32 is swung through a complete arc of 180 degrees in the process of opening or closing the valve. Thus, as seen in FIG. 5, when lever arm 32 is in the closed position, that is, in the position between ears 42, cams 34 are configured relative to the cam holes 52 and trunnion 56 to position plug 22 at its lower most extent of vertical travel. Similarly, when lever arm 32 is swung 180 degrees in arc to the opposite side of operator housing 36, the position of the cams relative to the cam holes 52 and trunnion 56, places the plug 22 at its upper-most extent of travel in a vertical direction. It will be observed that subsequent to the lever arm being positioned in a vertical plane to the side of housing 36 opposite ears 42, rotation of the lever arm in a horizontal plane does not change the relative position of cam holes 52 at trunnion 56. Accordingly, plug 22 remains in the same vertical position while it is subjected to rotational movement.

It will now be understood that what has been disclosed herein is a lever operator for a valve control and actuating mechanism primarily for use with plug type valves in which a tapered plug is raised to unseat associated slips and then rotated to a valve open position during opening of the valve and is rotated to a valve closed position and lowered to seat the associated slips for closing the valve. The invention comprises an elongated lever arm having a pair of eccentric cams at one end. The cams are attached to the valve plug trunnion for vertical motion of the valve plug. The invention also comprises a gated lever arm housing including gates or slots in which the lever arm is forced to ride to restrict the direction and sequence of motion of the arm to provide control of the valve plug for opening and closing the valve.

It will now also be apparent that the cam lever arm operator disclosed herein enables utilization of the aforementioned plug type valve with a significantly simpler and thus less costly operator apparatus thereby reducing the overall cost of manufacture and maintenance of the entire valve. Furthermore, it will be understood that although the applicant has disclosed the best mode presently contemplated for making and using his invention, the teaching contained herein will enable those having skill in the art to which the invention pertains to make various additions and modifications to the invention. By way of example, other means for providing locking engagement of the lever arm in either the fully opened or fully closed valve positions will become evident to those having skill in the art. However, it is to be understood that all such modifications and additions are contemplated to be within the scope of the invention which is to be limited only by the claims appended hereto.

I claim:

1. An improved operator apparatus primarily for use in a plug-type valve, the valve being of the type in which a tapered plug is raised vertically to unseat associated slips and then rotated to the valve open position for opening the valve and in which the opposite sequence of motions of the plug are effected for closing the valve, the plug having a trunnion through which the vertical and rotational motions of the plug may be effected; the improvement comprising:

a lever arm connected at one end to said trunnion and adapted for arcuate motion relative to said valve in at least two substantially perpendicular planes, said connection of said lever arm to said trunnion effecting only vertical motion of said trunnion in response to arcuate motion of said lever arm in one of said planes, and effecting only rotational motion of said trunnion in response to arcuate motion of said lever arm in another of said planes;

a housing connected to said valve and substantially enclosing said end of said lever arm connected to said trunnion, said housing being substantially cylindrical and having a first slot in a vertical plane and a second slot in a horizontal plane, said lever arm extending through said first slot during said vertical motion and extending through said second slot during said horizontal motion.

2. The improvement recited in claim 1 wherein said first slot restricts said lever arm to arcuate motion in a vertical plane and wherein said second slot restricts said lever arm to arcuate motion in a horizontal plane.

3. The improvement recited in claim 2 wherein said first slot terminates in a pair of parallel arcuate-shaped ears having aligned apertures for receiving a locking means for locking said lever arm in a valve closed position.

4. The improvement recited in claim 2 wherein said second slot terminates in a pair of parallel substantially rectangular flats having aligned apertures for receiving a locking means for locking said lever arm in a valve opened position.

5. The improvement recited in claim 3 further comprising a cylindrical tubular handle in overlying concentric relation with said lever arm at the end thereof opposite said trunnion and in substantially compressive spring engagement therewith for selective coaxial motion along said lever arm whereby said handle engages said ears in substantial compressive relation for releasably securing said lever arm in the valve closed position.

6. The improvement recited in claim 4 further comprising a cylindrical tubular handle in overlying concentric relation with said lever arm at the end thereof opposite said trunnion and in substantially compressive spring engagement therewith for selective coaxial motion along said lever arm whereby said handle engages said flats in substantial compressing relation for releasably securing said lever arm in the valve opened position.

7. The improvement recited in claims 5 or 6 further comprising a cylindrically-shaped, helically spring located within said lever arm in coaxial alignment with said lever arm and said handle; and
 a pair of pins, one such pin bearing against each end of said spring for compression of said spring between said pins;
 one of said pins terminating within perforations in said lever arm and another of said pins extending through elongated slotted apertures in said lever arm and through apertures in said lever arm and through apertures in said handle whereby movement of said handle along said lever arm away from said trunnion increases the compression of said spring.

8. A levered arm apparatus for effecting two distinct and sequential directions of motion in a member to which the apparatus is connected, the apparatus comprising:
 a lever arm having at least one cam at an end thereof, said cam having an eccentrically located aperture for connection to said member,
 a pin extending through said aperture and into said member for effecting said connection,
 a housing substantially enclosing said cam, said housing being substantially cylindrical and having a first slot in a vertical plane and a second slot in a horizontal plane, said lever arm extending only through said first slot in an arcuate path during motion of said member in a first direction and extending only through said second slot in an arcuate path during motion of said member in a second direction whereby said lever arm is constrained for distinct sequential directions of motion by said housing.

9. The apparatus recited in claim 8 wherein said member comprises the trunnion of a tapered plug of a plug-type valve and wherein said first direction is vertical and wherein said second direction is rotational, whereby movement of said lever arm through said slots effects opening and closing of said valve.

10. The apparatus recited in claim 9 wherein said first slot terminates in a pair of parallel arcuate-shaped ears having aligned notches for receiving a locking means for locking said lever arm in a valve closed position.

11. The apparatus recited in claim 9 wherein said second slot terminates in a pair of parallel substantially rectangular flats having aligned apertures for receiving a locking means for locking said lever arm in a valve opened position.

12. The apparatus recited in claim 9 further comprising a cylindrical tubular handle in overlying concentric relation with said lever arm at the end thereof opposite said trunnion and in substantially compressive spring engagement therewith for selective coaxial motion along said lever arm.

13. The apparatus recited in claim 9 further comprising a cylindrical tubular handle in overlying concentric relation with said lever arm at the end thereof opposite said trunnion and in substantially compressive spring engagement therewith for selective coaxial motion along said lever arm whereby said handle engages said ears in substantial compressive relation for releasably securing said lever arm in the valve closed position.

14. The apparatus recited in claim 9 further comprising a cylindrical tubular handle in overlying concentric relation with said lever arm at the end thereof opposite said trunnion and in substantially compressive spring engagement therewith for selective coaxial motion along said lever arm whereby said handle engages said flats in substantial compressing relation for releasably securing said lever arm in the valve opened position.

15. The apparatus recited in claims 12, 13, or 14 further comprising a cylindrically-shaped, helically spring located within said lever arm in coaxial alignment with said lever arm and said handle; and
 a pair of pins, one such pin bearing against each end of said spring for compression of said spring between said pins;
 one of said pins terminating within perforations in said lever arm and another of said pins extending through elongated slotted apertures in said lever arm and through apertures in said lever arm and through apertures in said handle whereby movement of said handle along said lever arm away from said trunnion increases the compression of said spring.

* * * * *